United States Patent [19]

Henry et al.

[11] Patent Number: 5,173,613
[45] Date of Patent: Dec. 22, 1992

[54] COORDINATE MEASURING MACHINE WITH IMPROVED TABLE SUPPORT

[75] Inventors: James L. Henry, Tipp City; Robert D. Donaldson, Centerville; Donald K. Greier, Inglewood; Freddie L. Raleigh; Frederick K. Bell, both of Centerville, all of Ohio

[73] Assignee: Warner & Swasey Co. Sheffield Measurement Div., Bloomfield Hills, Mich.

[21] Appl. No.: 688,754

[22] Filed: Apr. 22, 1991

[51] Int. Cl.[5] .................. G01N 21/86; G01B 5/03
[52] U.S. Cl. ................... 250/560; 33/503; 33/1 M
[58] Field of Search ........... 250/560, 561; 33/503, 33/1 M

[56] References Cited

U.S. PATENT DOCUMENTS 4,594,791 6/1986 Brandstetter .................. 33/503
4,763,420 8/1988 McCabe et al. ................ 33/503
4,852,267 8/1989 Tezuka ......................... 33/503
4,964,220 10/1990 Orr et al. ..................... 33/503
5,063,683 11/1991 Bury .......................... 33/503

Primary Examiner—David C. Nelms
Assistant Examiner—Michael Messinger
Attorney, Agent, or Firm—John R. Benefiel

[57] ABSTRACT

A coordinate measuring machine (10) having a three point support for a work supporting table (24) mounted over a base (12) constructed of a thermally dissimilar material. A first fixed support, (26A) and a laterally compliant second support (26B) are located at the front of the machine. The second front support (26B) is comprised of a pair of webs (28) oriented to be compliant in the lateral direction to allow relative thermal growth between the table (24) and base (12) while being rigid in the longitudinal direction to prevent rotation of the table (24) about the fixed front support (26A). Stacked crossed roller bearings (38A, 38B) provide a frictionless third point of support at the rear of the table (24).

7 Claims, 2 Drawing Sheets

COORDINATE MEASURING MACHINE WITH IMPROVED TABLE SUPPORT

This invention concerns a coordinate measuring machine (CMM) used for carrying out measurements on a workpiece supported on a table. The measurements are made by moving the tip of a probe between points of interest on the workpiece, and by measuring the displacement of the probe along each of three orthogonal axes (typically identified as the X, Y, and Z axes), the measurement can be made. In one common form of CMM, the probe is supported to be movable along a Z-axis on an X-axis carriage, the X-axis carriage in turn supported on a Y-axis carriage, each carriage movable on corresponding ways and bearings for precisely guided movement along each axis. Means are employed to detect linear movement along each axis and generate corresponding electrical signals. A transducer in wide use has involved detection of a Moire' fringe pattern generated by a slightly skewed grid moving along a grating fixed along an axis of movement, the pattern being detected by photocells which generate electrical output signals processed by suitable circuitry for display or further processing.

U.S. Pat. No. 4,261,107 issued on Apr. 14, 1981 for a "Coordinate Locating Device" describes a horizontal probe measuring device using laser to detect linear movement of the probe.

U.S. Pat. No. 4,682,418 issued on Jul. 28, 1987 for a "Coordinate Measuring Machine" describes a machine having a work supporting table spaced above the machine base. In order to lighten the moving carriages, these components may be constructed of aluminum, and since bearing ways are mounted to the base, the base also is constructed of aluminum to minimize the effects of differences in thermal growth which would occur if the base were constructed of a different material.

The table must be quite rigid to avoid excessive deflections under the weight of heavy workpieces, and hence is typically constructed of steel, granite, or other material having dissimilar thermal growth characteristics from the aluminum base.

In order to avoid stresses which could occur because of the different growth characteristics of these structures, U.S. Pat. No. 4,682,418 describes and claims a particular three point support of the table on the base. This support includes a first fixed support, a second pin and slot support allowing relative movement in a single lateral direction but preventing table rotation about the first support.

A third thrust bearing support allows horizontal movement in either lateral or longitudinal direction.

This combination supports the weight of the table and is intended to prevent any shifting of the table in the horizontal plane, while allowing relative thermal growth between the table and base which could result from ambient temperature changes without imposing significant stress on the base such as to distort the ways.

However, it has been found that unless the pin and slot connection is machined to very close tolerances, clearance will exist between the pin and slot, which will allow slight fore and aft shifts in the table position relative to the base, leading to measurement inaccuracies.

Furthermore, the rear thrust bearing previously employed been found to inadequate to resist without damage unusual table loads, such as occur when heavy parts are dropped on the table. Permanent indentations sometimes occur, causing sticking points in the bearing to hinder its desired friction free operation.

SUMMARY OF THE INVENTION

The present invention provides a coordinate measuring machine of the type having a table supported above a base, having an improved three point table support accommodating relative thermal growth between a table and base of dissimilar material, without the need for close tolerance machining of parts. The improved table support comprises a first fixed front support as in the prior design. The second front support however is formed of one or more and preferably a pair of parallel web plates disposed extending longitudinally so as to be very rigid in the fore and aft direction. This acts like a pin and slot connection to prevent any table rotation about the first support but does not involve any clearances which could result in slight shifting of the table.

The third rear support comprises a crossed roller bearing stack allowing friction free expansion of the rear of the table relative the base in either a lateral or longitudinal direction, the stacked roller bearings able to accommodate very heavy table loading without deforming the bearing parts.

DETAILED DESCRIPTION

Figure 1:
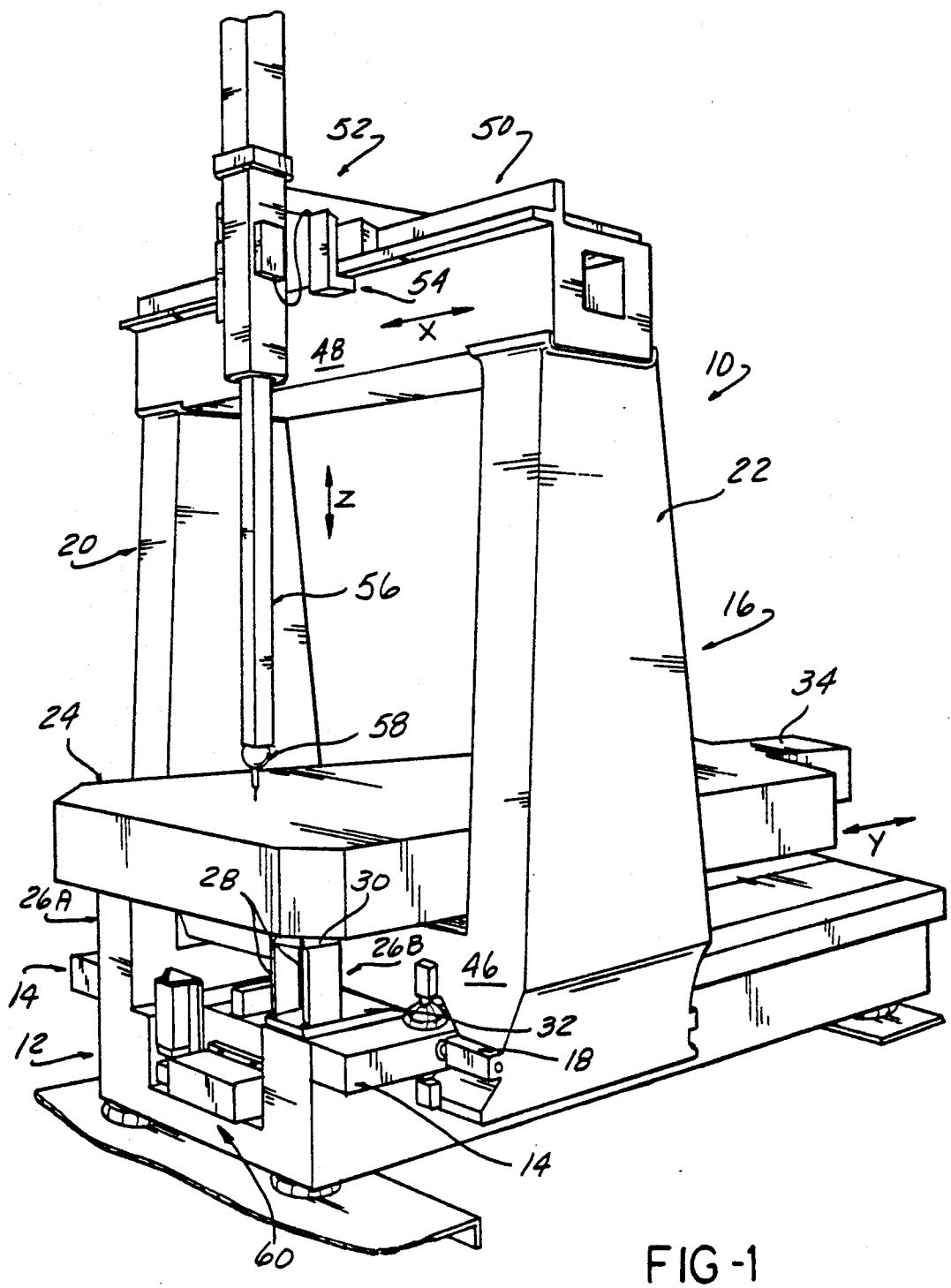
FIG. 1 is a perspective view of a coordinate measuring machine using a table support system according to the present invention.

FIG. 1 illustrates a coordinate measuring machine (CMM) 10 of a type having a base 12 formed on either side with parallel laterally spaced apart ways 14 extending longitudinally in a front to rear direction. A Y-axis carriage 16 is supported on the base by means of an air bearing array 18 on either side thereof. The base 12 is preferably supported on a suitable floor vibration isolator system.

The Y-axis carriage 16 is supported and guided on the ways 14 for linear movement along the longitudinal direction of the ways 14, this direction referred to as the Y-axis.

The Y-axis carriage 16 is of hollow construction, as of welded aluminum panels or a thin walled casting, and includes a pair of upright legs 20, 22 extending above the base 12 and a workpiece supporting table 24. The table 24, which may be of steel or granite to be able to support the weight of very heavy workpieces without excessive deflections, is supported spaced above the upper surface of the base 12 on a three point support.

An aligned three point support of a table on the base and the base on the floor is preferable as described in U.S. Pat. No. 4,682,418 issued on Jul. 28, 1987 for a "Coordinate Measuring Machine".

The difference in thermal growth between an aluminum base and a steel or granite table can cause distortions of the base when temperature fluctuations occur tending to distort the ways 14, and hence a special mounting is employed, which is an improvement of that described in U.S. Pat. No. 4,682,418 to accommodate relative thermal growth.

In the machine shown in FIG. 1, a first completely fixed front support 26A is combined with a second front support 26B spaced to the side of the first front support 26A.

The second front support 26B is comprised of a connecting structure, here taking the form of one or more, preferably a pair, of laterally spaced apart webs 28, extending longitudinally, i.e., normal to a line joining the front supports 26A, 26B and parallel to the length of the table 24 and the Y-axis. The webs 28 are each fixed along their top edges and bottom edges to plates 30, 32, and secured to the table 24 and base 12 respectively. The webs 28 are thus oriented so as to be relatively compliant to bending in a lateral direction, but to be rigid against bending in the longitudinal direction.

This second support connecting structure creates a rigid connection in the direction of the Y-axis to resist any table rotation about the first front support 26A, while allowing limited relative lateral movement resulting from relative lateral thermal growth between the base 12 and tables 24. Since no clearances are involved nor precision machining required, this structure thus avoids the disadvantage of the pin and slot connection as described above.

While some force is generated in bending the webs 28 sideways, this force is applied laterally to the base 12. Since the ways 14 extend longitudinally 28, deflections of the base 12 as a result of laterally applied forces results in much less serious deflections of the ways 14, and hence can be tolerated. Also, the lateral dimension of the base 12 is usually much shorter than the length thereof, further minimizing deflections caused by laterally applied forces.

Figure 2:
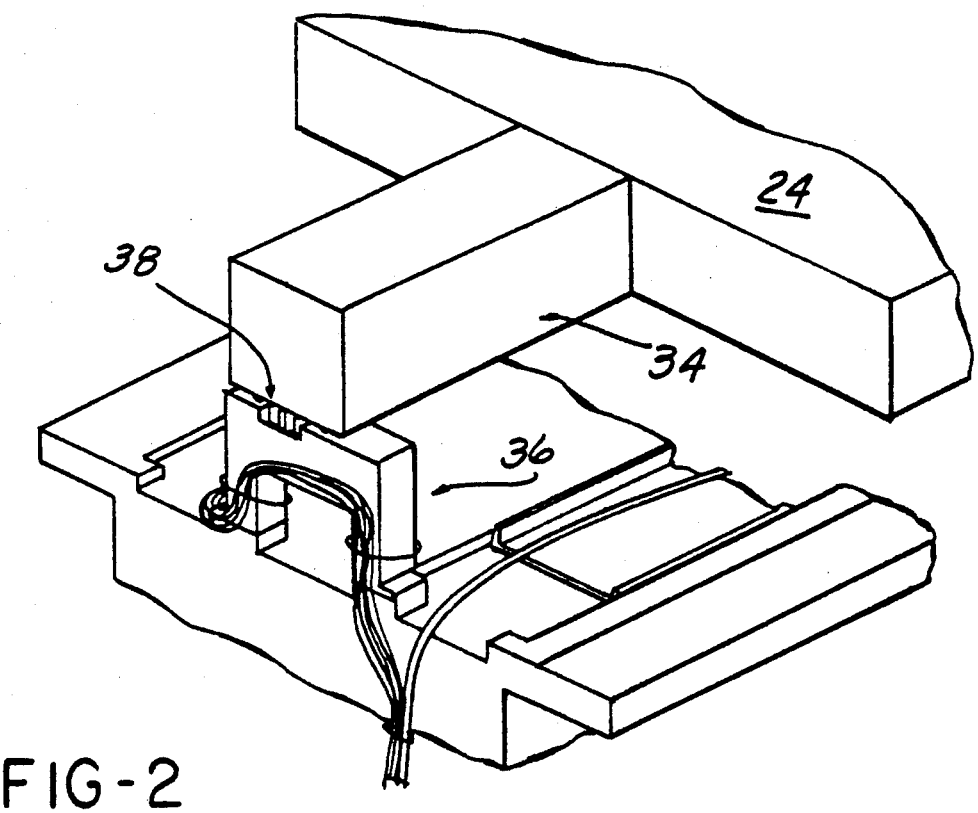
FIG. 2 is a fragmentary perspective rear view of the coordinate measuring machine shown in FIG. 1.
Figure 2A:
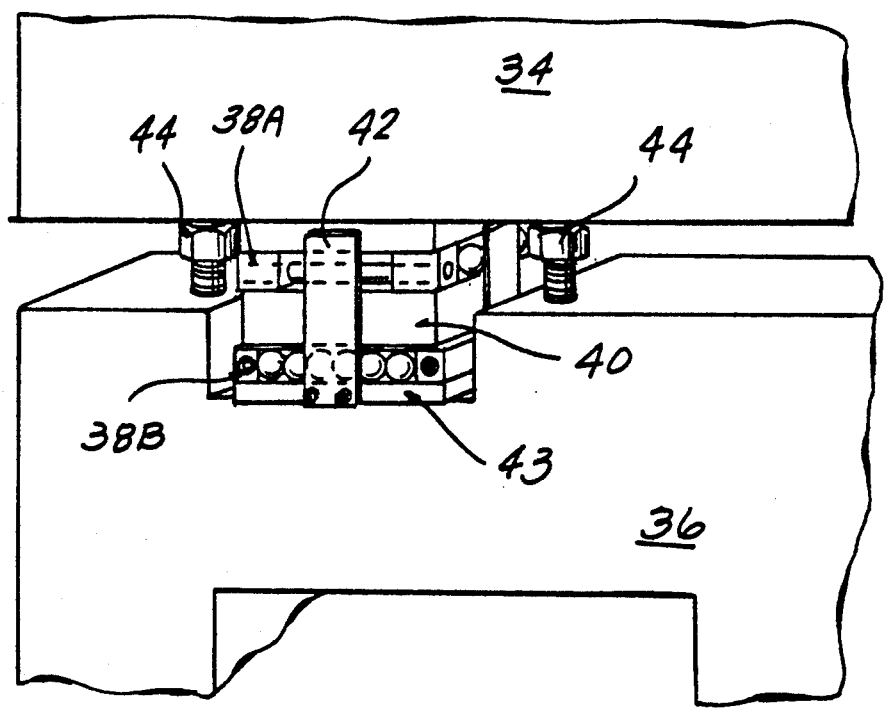
FIG. 2A is an enlarged perspective view of the rear table support bearing shown in FIG. 2.

FIG. 2 shows a table extension 34 fixed to the rear of the table 24 as in the above referenced U.S. Pat. No. 4,682,418, the extension 34 supported on a pedestal 36 and a crossed roller bearing stack assembly 38, comprising the third table support, spaced longitudinally to the rear of the first and second supports 26A, 26B.

FIG. 2B shows the pair of roller bearings 38A, 38B separated by a bearing plate 40. Roller bearing 38A is free to roll in the longitudinal or Y-axis direction, and bearing 38B free to roll in the lateral or X-axis direction. This arrangement has been found to be much more robust and resistant to bearing deformation by high table loads, as caused by accidental dropping a heavy workpiece on the table 24. Confinement straps 42 are attached to a lower bearing plate 42 to prevent the escape of either roller bearing 38A, 38B during assembly.

Very low friction is important for the third or rear support comprised of the crossed roller stack assembly 38. This is because forces applied in a longitudinal direction will result in much more serious deflection of the ways 14. Further, the lengthwise direction is often much greater, such that the extent of relative thermal growth is much larger and the effect of base deflections are increased.

Support studs 44 may be used to hold the weight of the table 24 and extension 34 during assembly.

The upright legs 20, 22 of the Y-axis carriage are connected at their lower ends by a cross beam 46 extending across the width of the base 12 in the intervening space between the underside of the table 24 and the upper surface of the base 12. This forms a so called "ring bridge" as described in U.S. Pat. No. 33,254 issued on Jul. 10, 1990 for a "Bridge Type Coordinate Measuring Machine".

The upper end of each of the legs 20, 22 are connected by an upper cross beam 48, formed with X-axis guide and support ways 50, on which is guided and supported an X-axis carriage 52 by air bearings 54, in the manner well known in the art and as described in the above cited U.S. Pat. No. 33,254.

The X-axis carriage 52 carries a probe shaft 56 guided therein as by air bearings (not shown) in the manner well known in the art. The weight of the probe shaft 56 may be supported by a counterbalance system, such as described in U.S. Pat. No. 4,799,316 issued on Jan. 24, 1989 for a "Coordinate Measuring Machine with a Probe Shaft Counter Balance System".

The Y-axis carriage 16, X-axis carriage 52, and probe shaft 56 may be manually moved along their respective axes, or, driven by servo drives (not shown) under joy stick or CNC control, as well known in the art, to move a probe tip 58 to successive points of interest on a workpiece supported on the upper surface of the table 24.

Each increment of movement of each of these structures along the X,Y, and Z axes is measured as by optical grids or laser interferometers in the manner well known in the art.

We claim:

1. In combination with a coordinate measuring machine (10) having a base (12) and longitudinally extending parallel ways (14) laterally spaced apart and fixed to said base (12), a Y-axis carriage (16) supported on said base (12) for guided longitudinally movement along said ways (14), a work supporting table (24) mounted above said base (12), said table (24) of a thermally dissimilar material from said base (12), and having a table support system for supporting said table (24) on said base (12), including a three point support, with a first fixed support means (26A) fixed to said table (24) and said base (12), a second support means (26B) laterally spaced apart from said first support (26A), connecting said table (24) and said base (12) to allow limited lateral movement between said table (24) and base (12), in a lateral horizontal direction while rigidly resisting relative movement in the longitudinal direction, and a third support means (38) longitudinally spaced from said first and second supports (26A, 26B) and connecting said table (24) and base (12) so as to allow limited relative lateral and longitudinal horizontal movement between said table (24) and base (12), the improvement wherein said second support means (26B) comprises at least one connecting structure (28) fixed to said table (24) and base (12) configured and oriented to be substantially compliant to bending in said lateral direction but rigid in the longitudinal direction.

2. The coordinate measuring machine (10) according to claim 1 wherein said third support means comprises a pair of stacked roller bearings (38A, 38B) with an interposed plate (40), one of said roller bearings (38A) oriented to allow rolling in said lateral direction and said other roller bearing oriented to allow rolling in said longitudinal direction.

3. The coordinate measuring machine (10) according to claim 1 wherein said connecting structure of said second support comprises at least one web (28) having a top edge and a bottom edge, said web (28) fixed along said top edge to said table (24) and along said bottom edge to said base (12), said web (28) oriented to extend longitudinally.

4. The coordinate measuring machine (10) according to claim 3 wherein said connecting structure of said second support comprises a pair of spaced apart parallel webs (28) each having a top and bottom edge fixed to said table (24) and base (12) respectively.

5. The coordinate measuring machine (10) according to claim 4 further including a top plate (30) and bottom plate (32) integral with said top and bottom edges respectively of said pair of webs (28), said top plate (30) fixed to the bottom of said table (24) and said bottom plate (32) fixed to the top of said base (12).

6. The coordinate measuring machine according to claim 5 wherein said base (12) is constructed of aluminum and said table (24) is constructed of steel.

7. The coordinate measuring machine according to claim 6 wherein said third support means comprises a pair of stacked roller bearings (38A, 38B) with an interposed plate (40), one of said roller bearings (38A) oriented to allow rolling in said lateral direction and said other roller bearing oriented to allow rolling in said longitudinal direction.

* * * * *